United States Patent [19]
Crepin

[11] Patent Number: 5,988,011
[45] Date of Patent: Nov. 23, 1999

[54] CABLE END-PIECE

[75] Inventor: Herve Crepin, Noyelles Sur Mer, France

[73] Assignee: Sram France s.a.r.l., Chepy, France

[21] Appl. No.: 09/010,709

[22] Filed: Jan. 22, 1998

[30]    Foreign Application Priority Data

Feb. 3, 1997  [FR]  France ................................. 97 01167

[51] Int. Cl.⁶ ................................................ F16C 1/10
[52] U.S. Cl. ................. 74/502.4; 74/502.6; 74/501.5 R; 403/197
[58] Field of Search ............................... 74/500.5–502.6; 403/197

[56]             References Cited

U.S. PATENT DOCUMENTS

| | | | |
|---|---|---|---|
| 3,221,572 | 12/1965 | Swick | 74/501.5 R |
| 3,528,313 | 9/1970 | Berno | 74/501.5 R |
| 4,079,950 | 3/1978 | Langford | 74/502 |
| 4,132,415 | 1/1979 | Langford | 74/503 X |
| 4,304,149 | 12/1981 | Heimann | 74/501 R |
| 4,534,239 | 8/1985 | Heimann | 74/501.5 R |
| 4,621,937 | 11/1986 | Maccuaig | 403/197 |
| 4,860,609 | 8/1989 | Spease | 74/502.4 |
| 4,884,467 | 12/1989 | Martell | 74/501.5 R |
| 5,582,074 | 12/1996 | Kelley et al. | 74/502.4 |

FOREIGN PATENT DOCUMENTS

| | | |
|---|---|---|
| 2 614 659 | 11/1988 | France . |
| 85 10 490 U | 1/1987 | Germany . |
| 1 389 297 | 4/1975 | United Kingdom . |

*Primary Examiner*—Vinh T. Luong
*Attorney, Agent, or Firm*—Baker & Daniels

[57]              ABSTRACT

A cable end-piece for a cable which slides in a flexible sheath. The end-piece includes a hollow tubular body which is closed by a base. The base has an opening for the passage of a cable therethrough. The base includes an extension which has an outer surface and an inner surface. The inner surface is provided with a seal to sealingly contact the cable. The outer surface has at least one groove which is connected to the inner surface by means of channels. The material from which the seal is made also fills the channels.

6 Claims, 3 Drawing Sheets

CABLE END-PIECE

BACKGROUND OF THE INVENTION

The present invention concerns a cable end-piece for a motion transmission device formed of a cable sliding in a flexible guide sheath, the end-piece being fixed to at least one end of the cable, one known prior art end-piece comprises:

a tubular body closed by a base provided with an opening for the passage of the cable, the body receiving and retaining the sheath, a seal traversed by the cable to protect the inside of the sheath.

Cable end-pieces are used for devices for the transmission or motion by means of cables and sheaths (also called Bowden cables). Such transmissions are used in many applications, in place of rigid transmission means such as rod assemblies, such as, for example, the controls for the brakes of bicycles, motorcycles or motor cars, or for the clutch controls of motorcycles.

These flexible trans-mission devices are generally more or less exposed to the weather and become dirty. However, the dirt deposited on the outside of the sheath is carried inside the latter through the end-piece. The dirt between the sheath and the cable hardens or may even prevent the sliding of the cable.

The expression "cable" used in the present description to designate the element sliding in the guide sheath is taken in the general sense and covers the different alternative fores of cables, including piano wire.

It is already known to produce a cable end-piece of the type defined above.

It is known in particular, according to the document FR 26 14 659, to produce a cable end-piece composed of a tubular body closed by a base provided with an opening for the passage of the cable. This tubular body receives a sheath stop delimiting a seating with the base of the body to receive a seal formed of one or more thin circular plates placed one behind the other and traversed by the cable.

This solution is relatively complicated to manufacture, since it is necessary to produce the body of the end-piece, the sheath stop and the seal or seals and to place these different elements in position before being able to place the end-piece on the end of the cable.

SUMMARY OF THE INVENTION

The present invention aims to eliminate these draw-backs and proposes to provide an end-piece which is light, simple to manufacture, and which provides perfect sealing of the inside of the sheath.

To this end, the invention concerns an end-piece of the type defined above, characterized by a tubular extension borne by the base of the tubular body, coaxially with the tubular body, this extension having its inner surface equipped with a seal, with lips, in the form of a sleeve traversed by the cable.

According to another characteristic:

the outer surface of the extension is provided with at least one groove connected to the inner surface by at least one channel, the material of the seal with lips, passing through the channel and forming an external seal in the groove of the outer surface.

Owing to its tubular extension, the end-piece can be equipped integrally with a seal on its inner surface. The seal is fixed to the extension by a bond through the material, that is to say, adhesive bonding or welding against the inner surface of the extension, or complementarily by mechanical engagement constituted by the plug formed in the channel or channels connecting the inner surface of the tubular extension to the groove of the outer surface of the said extension.

The seal formed on the tubular extension is itself a seal of tubular shape exerting a strong pressure on the cable and thus ensuring a more leaktight seal than can be provided by one or more plate-like seals. This end-piece with integral seal has the advantage of being light and also simple to manufacture. This also, very importantly, facilitates the positioning of the end-piece on the end of the sheath. Manufacturing tolerances and wear have little influence on the sealing effect and the dirt-scraping effect.

Finally, this end-piece itself fits in a leaktight manner in the stop at the end of the transmission device. This sealing produced by the external seal or seals also contributes to the protection of the inside of the sheath.

According to other advantageous characteristics of the invention:

the end-piece includes at least two peripheral lips at each end of the seal with which the inner surface is equipped, the end-piece includes two external seals housed in grooves provided in the outer surface of the extension and/or of the tubular body, a plurality of limbs connect the internal seal to the external seal, the tubular body with its base and its tubular extension are produced in polypropylene and the seal is a rubbery material, the end-piece is produced by two-stage injection, in which first the tubular body, the base and the tubular extension are injected, then the part constituting the seal of the inner surface and the seal or seals of the outer surface, injection being effected from the outside through tho channel or channels connecting the groove of the outer surface to the inner surface of the tubular extension.

BRIEF DESCRIPTION OF THE DRAWINGS

The present invention will be described in more detail hereinafter by means of different exemplary embodiments shown diagrammatically in the accompanying drawings.

DESCRIPTION OF THE PREFERRED EMBODIMENTS

Figure 1:
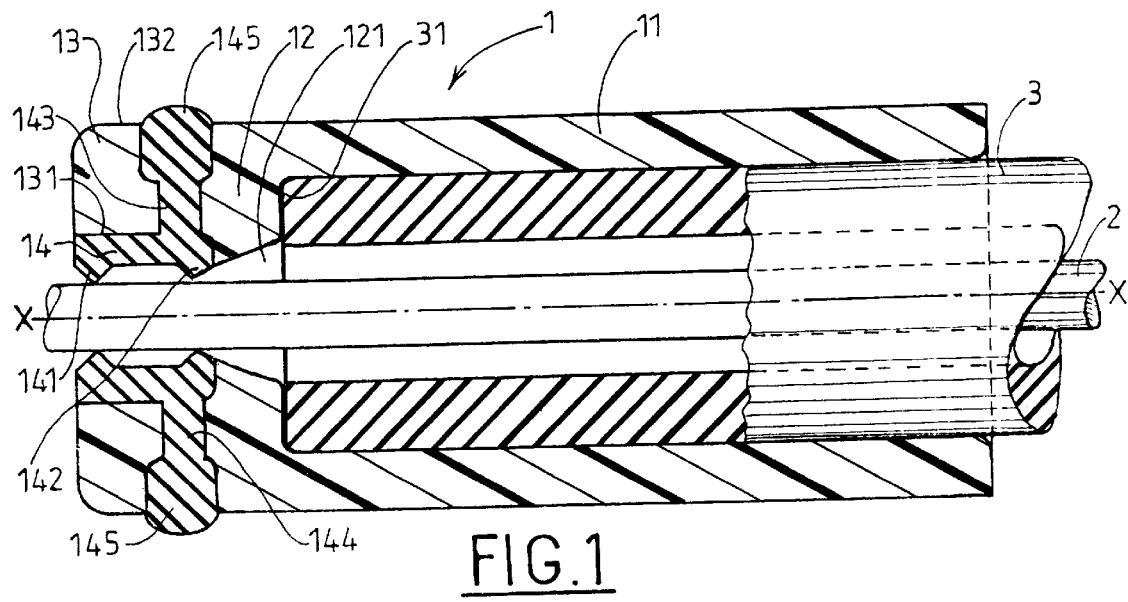
FIG. 1 is a view in partial axial section of a first cable end-piece and of the end of the transmission device.
Figure 2:
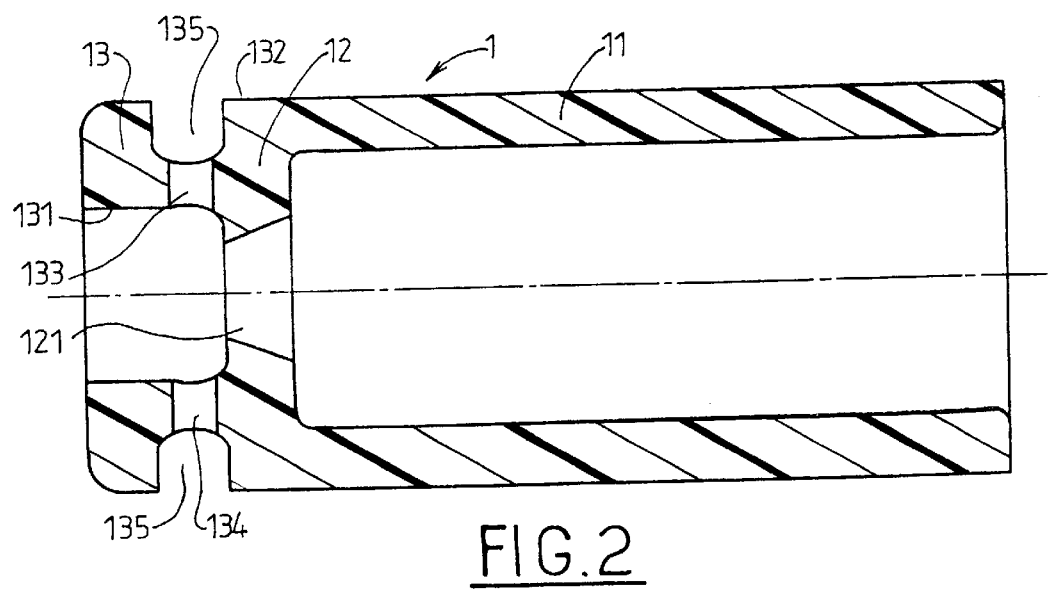
FIG. 2 shows in longitudinal axial section the body of the end-piece FIG. 1 before the production of the seal.

FIGS. 1 and 2 show a cable end-piece according to the invention, intended for a motion transmission device, comprising a cable 2 sliding in a flexible sheath 3. The end-piece 1 mounted on the end of the sheath 3 is traversed by the cable 2.

The end-piece 1 consists of a tubular body 11 terminated by a base 12 provided with a conical opening 121 for the passage of the cable 2.

The base 12 serves as a stop at the end 31 of the sheath 3.

The base 12 continues in a tubular extension 13 located on the other side of the base 12 with respect to the tubular body 11. The tubular extension 13 has an inner surface 131 and an outer surface 132. The inner surface 131 is equipped with a seal 14, of tubular shape, coaxial with the axis XX of the cable. The seal 14 is provided with low sealing lips 141, for example of very flared triangular section as shown. According to this example, the seal 14 has two lips 141, 142, one at each end of its tubular body. It may include intermediate lips.

The seal is connected to the outer surface 132 of the extension 13 by limbs 143, 144 opening into the peripheral groove 135 of the extension 13. The peripheral groove itself houses a peripheral portion integral with the other parts of the seal and which itself constitutes an external seal 145.

In order to facilitate understanding of the structure of the seal, FIG. 2 shows only the whole of the end-piece formed by the tubular body 11, the base 12 and the extension 13. FIG. 2 reveals the two channels 133, 134 connecting the inner surface 131 to the outer surface 132 of the extension 13 and in particular the peripheral groove 135.

The seal 14 is fixed to the extension 13 by a chemical and/or mechanical bond, depending on the nature of the materials used.

Thus, in the case of an end-piece 1 with tubular body 11, base 12 and extension 13, produced in a plastics material, for example a polypropylene, and with a seal 14 produced in a rubbery material such as a relatively flexible and gripping plastic, a synthetic rubber, etc., the bond between the seal 14 and the inner surface 131 of the extension 13 is chemical in nature, in the form of a chemical bond or adhesive bonding. The mechanical bond, constituted by the limbs 143, 144, completes this chemical bond.

In the case of elements 11, 12, 13, on the one hand, and the seal 14 on the other hand, in materials which have no chemical interaction, the bond will be provided by the mechanical engagement of the limbs 143, 144 in the channels 133, 134.

This mechanical engagement may be completed by a non-smooth shape imparted to the inner surface 131 of the extension 13.

Figure 3:
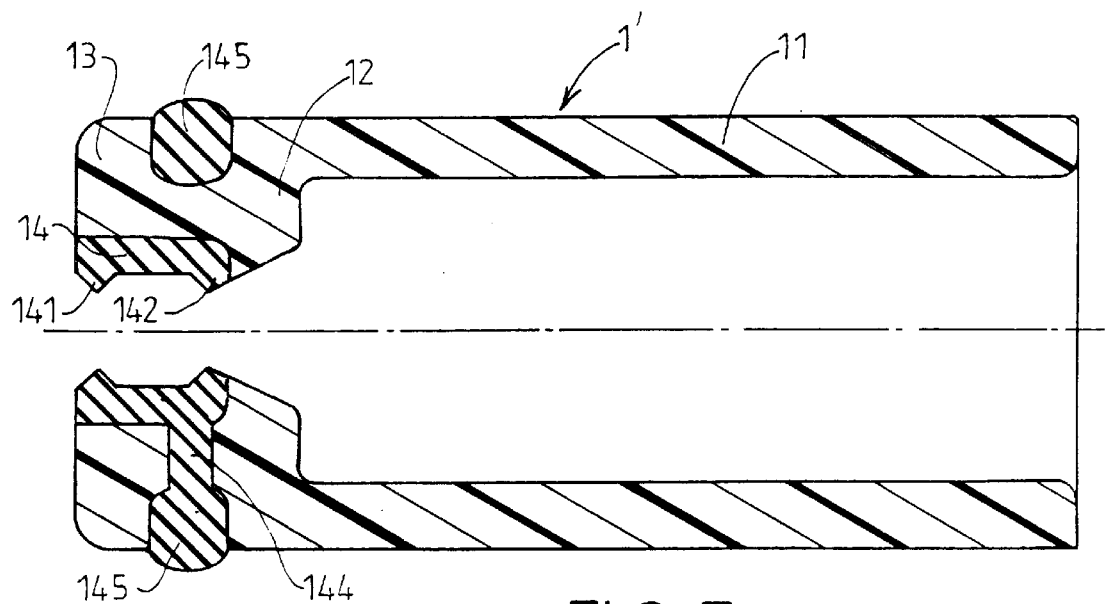
FIG. 3 shows another embodiment of the end-piece according to the invention.
Figure 4:
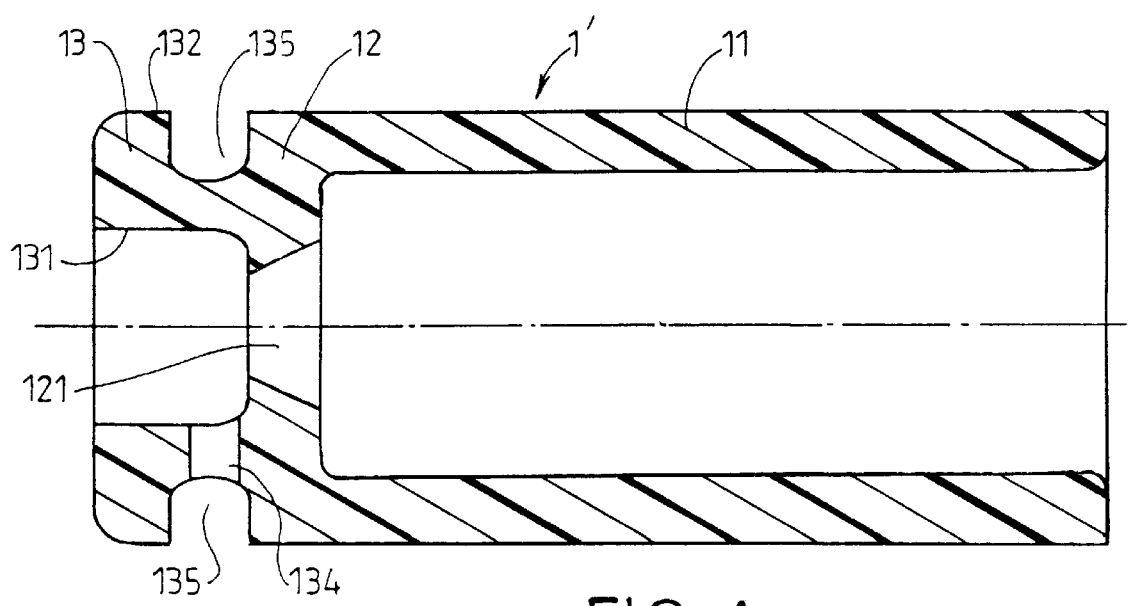
FIG. 4 shows in axial section the body of the end-piece of FIG. 3 before the production of the seal.

FIGS. 3 and 4 show another of the end-piece 1' of the invention. For the description of this variant, the same references will be used as for those described and shown in FIGS. 1 and 2, and the description will be limited to the difference between this embodiment and the preceding embodiment.

The only difference in fact consists of the omission of the channel 133 connecting the inner surface 131 to the outer surface 132 or to the groove 135 of the extension 13.

In fact, the channels providing this bond can be provided in an even number and in diametrically opposed positions as in the embodiment in FIGS. 1 and 2. The channels may also be provided in an odd number, in a uniform peripheral distribution, which corresponds to the exemplary embodiment of FIGS. 3 and 4. These figures show a view in axial section which passes through only one of the channels, since there are an odd number of the latter.

In the simplest case, there is only a single channel.

Figure 5:
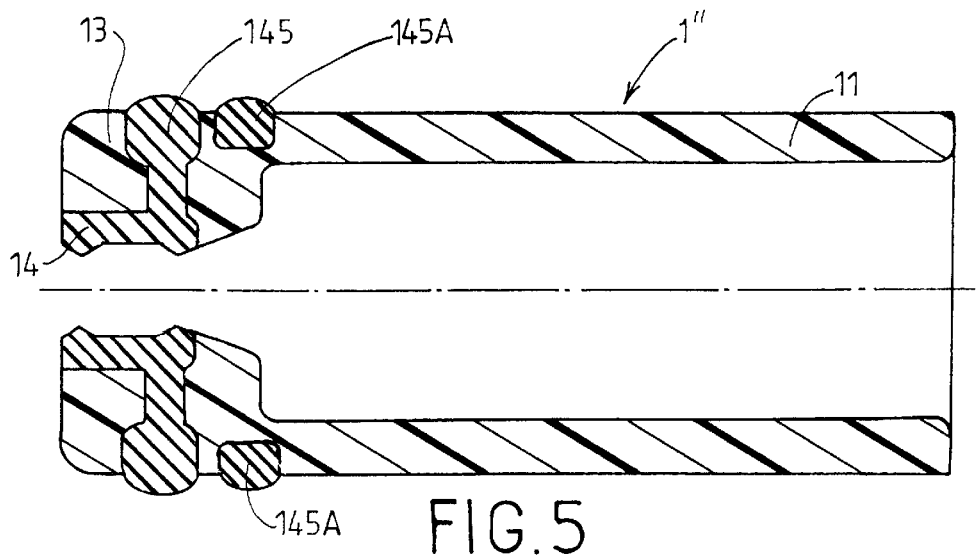
FIG. 5 shows an axial section of third embodiment of the end-piece according to the invention.
Figure 6:
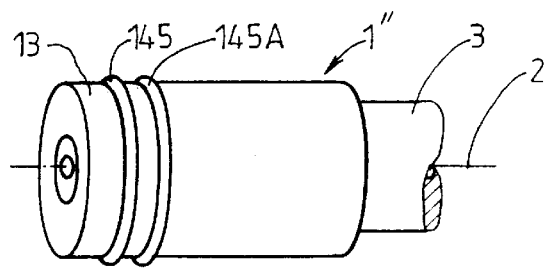
FIG. 6 is a perspective view of the end-piece in FIG. 5 mounted at the end of a transmission device with flexible sheath and cable.

The embodiment 1" or FIGS. 5 and 6 is distinguished from the two preceding variants 1 and 1' by the production of a second seal 145A in a supplementary groove in addition to the seal 145. The other elements of this embodiment are identical to those of the first two embodiments; there may be an even number or channels, for example two, as shown, or an odd number, and especially a single channel as in the second embodiment.

FIG. 6 shows an external view of an end-piece 1" like that in FIG. 5 with the flexible sheath 3 and the cable 2, and especially the two external seals 145, 145A.

Figure 7:
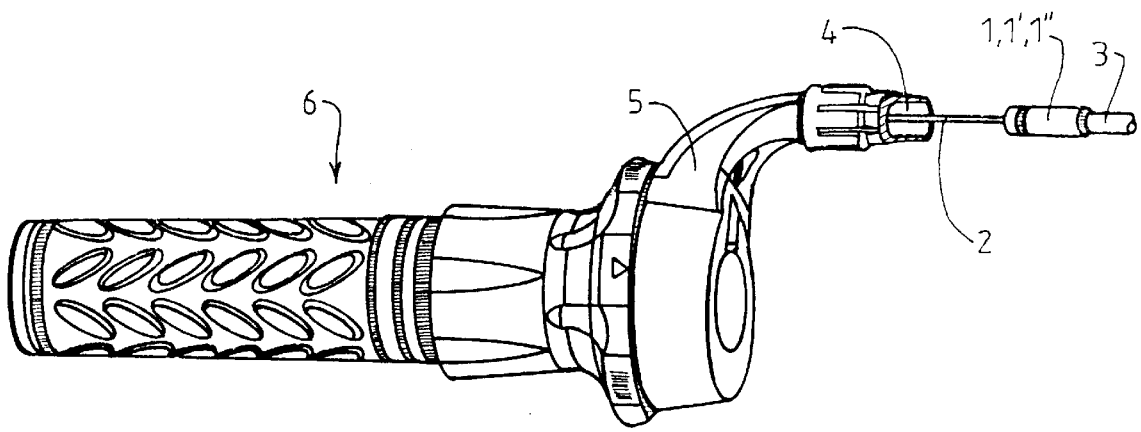
FIG. 7 shows an example of the application of the invention for a cable transmission with which a control handle is equipped.

FIG. 7 shows a general view of the placing in position of an end-piece 1, 1', 1" according to any one of the preceding exemplary embodiments, at the end of the sheath 3 on the cable 2 so as to fit into the seating of a stop 4 borne by the horn 5 of a handle 6. This is for example a motorcycle handle.

In conclusion, the end-piece according to the invention with its integrated seal offers better sealing than the known end-pieces with added-on seal; this sealing is also more reliable and less sensitive to wear. This sealing is perfect.

A supply of lubricant is also provided between the lips of the seal, making it possible to lubricate the cable continuously and thus to protect the cable, reduce friction and make operation tore convenient.

The manufacture of the end-piece according to the invention is extremely simple. In the case of an end-piece produced in plastics materials, it is possible to proceed with two-stage injection which consists in producing the elements 11, 12, 13 of the end-piece in a first step, then injecting the seal 14 through the outer groove 135 and the channels 133, 134 in order to reach the level of the inner surface 131 of the tubular extension 13.

The end-piece according to the invention offers not only the advantage of improved operation and greater reliability, but also that of being much lighter, which is generally very important for equipment on motor vehicles, motorcycles or cycles, or in the field of aeronautics, which constitute all the fields of application or a system of transmission with sheath and cable capable of receiving an end-piece according to the invention.

I claim:

1. A cable end-piece for a motion transmission device which includes a cable slideably disposed in a flexible guide sheath, the cable end-piece secured to an end of the cable, said cable end-piece comprising:
   a hollow tubular body having an open end, said body including a base which closes said open end, said base including an opening for the passage of a cable therethrough, said tubular body adapted to receive and retain a said cable guide sheath, said base including a tubular extension having an outer surface and an inner surface, said tubular extension coaxial with said tubular body, said outer surface having a groove;
   at least one channel interconnecting said groove and said inner surface;

a seal disposed on said inner surface, in said channel, and in said groove, and adapted to sealingly contact a said cable.

2. End-piece according to claim 1, wherein said seal includes two peripheral lips adapted to sealingly contact a said cable.

3. End-piece according to claim 1, wherein said seal includes two external seals housed in said groove.

4. End-piece according to claim 1, and including a plurality of channels interconnecting said groove and inner surface, said seal including a plurality of limbs interconnecting the portions of said seal disposed on said inner surface and in said groove.

5. End-piece according to claim 1, wherein the tubular body, the base, and the tubular extension are made of polypropylene and wherein the seal is made of a rubbery material.

6. End-piece according to claim 5, wherein the end-piece is produced by two-stage injection, in which the tubular body, the base and the tubular extension are first injected and the seal is injected from the outside surface through the channels.

* * * * *